United States Patent Office 3,214,129
Patented Oct. 26, 1965

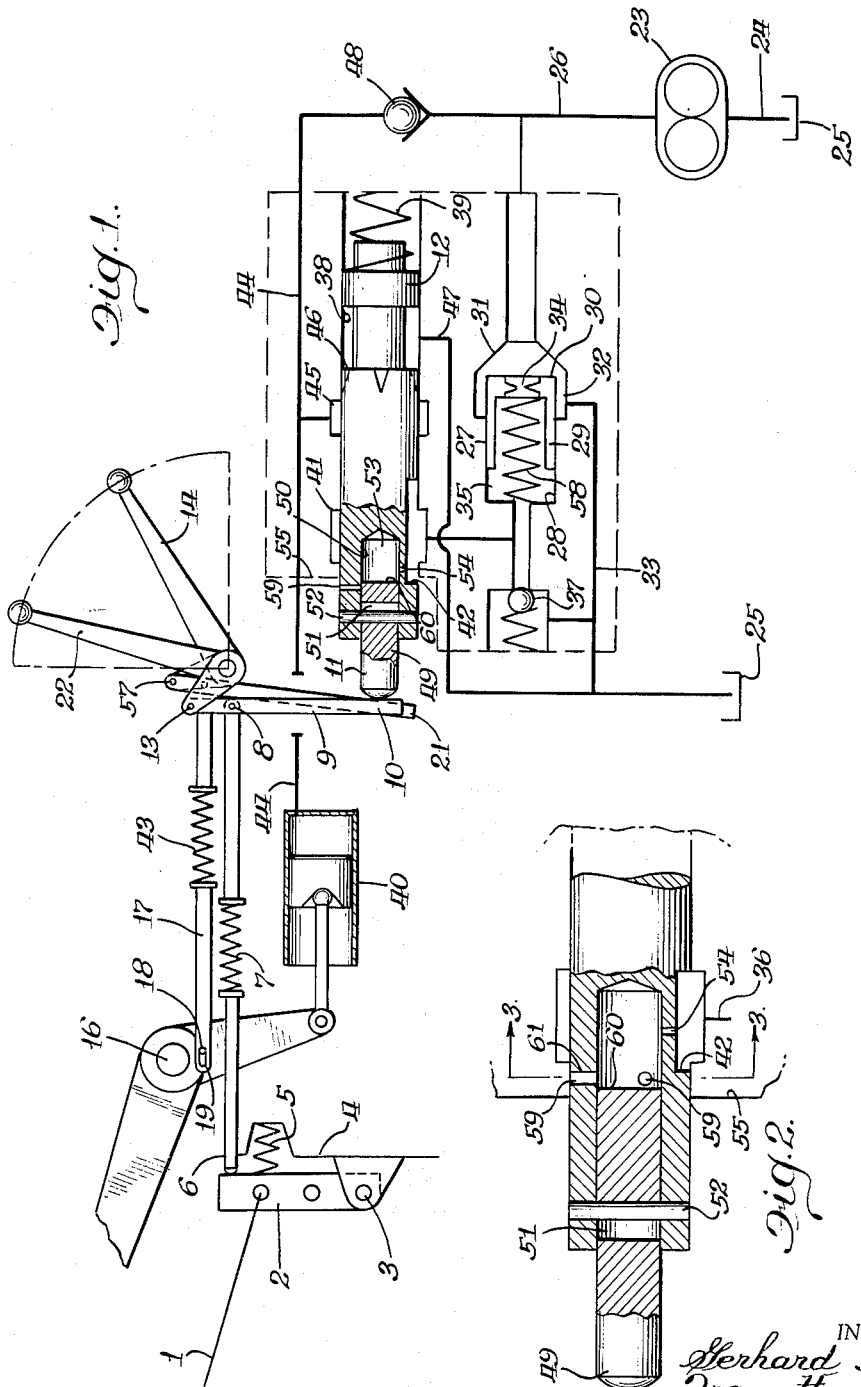

3,214,129
CONTROL SPOOL FOR A DRAFT POSITION CONTROL HYDRAULIC SYSTEM
Gerhard Pusch, Neuss, and Franz Henninghaus, Dusseldorf, Germany, assignors to International Harvester Company, Chicago, Ill., a corporation of New Jersey
Filed July 12, 1963, Ser. No. 294,618
3 Claims. (Cl. 251—38)

This invention relates to a control spool for a hydraulic system, in particular for use with farm tractors and endeavors to further improve such control spools. It represents a further development of the control spool protected in our co-pending U.S. patent application No. 195,668 filed May 14, 1962.

The invention according to our co-pending application endeavors to create means for actuating a draft/position control hydraulic system operating with no-pressure circulation when its control valve is in a neutral position and to prevent the control spool from remaining in a position in which the delivery flow of the pump is throttled. The control cross-sections of the control spool are thus to open quickly and fully in spite of slow spool motion. The solution disclosed in our co-pending application is characterized in that the control spool carrying the surface for controlling the pressure-oil flow has a slight axial displaceability that is independent of the mechanical actuation of the control spool. The spool has a pressure surface that is acted upon by the pressure in the line to be controlled for displacement in shifting direction. A throttle position is thus safely avoided when shifting the draft/position control hydraulic system from neutral to lifting which otherwise would cause a loss of power and oil heating. The prerequisite for the efficiency of the above solution is that the shifting sluggishness of the control device is so great that always a certain overside control takes place which guarantees that the throttle position remains ineffective when shifting from lifting to neutral. This is sufficient for most practical requirements. It was found, however, that under certain conditions, in particular with relatively small deliveries and high working pressures, throttling cannot be safely avoided when shifting from lifting to neutral.

The object of this invention is to eliminate this disadvantage and to create a control device that safely excludes the possibility of throttling in both shifting directions: from neutral to lifting and from lifting to neutral. This objective is to be reached by simplest means that permit an inexpensive production.

The subject problem is solved as follows: The end of the control spool is designed as a piston which is movably guided in a bore in the control spool between two stops. The spool bore is designed as a pressure chamber and is connected with the pressure line through a throttle bore and with the outer surface of the spool through radial bores, the lateral limitation of which is almost flush with the control edge of the spool and the inner openings of which can be crossed by the front surface of the piston.

With such a spool shifting from neutral to lifting is safely guaranteed with minimum throttling. In case of high working pressures and small deliveries, pressure oil is directed to the hydraulic cylinder until the spool is in its neutral position. Thus it cannot remain in a throttling position.

In a suitable embodiment of the invention, the axial displaceability of the spool as against the piston is limited by a pin that pervades spool and piston, the transverse bore of the piston being larger that the pin diameter, and a return spring acting upon the spool. The return spring keeps the pin in abutment against one side of the bore.

No double fit is required in this construction because two parts only are counteracting at a time. The play among the spool portions necessitates a certain lift-over action that is so small that the control is not impaired.

These and other objects of this invention will become clear to those skilled in the art upon reading the following specification in conjunction with the drawing, in which:

FIGURE 1 shows a schematic illustration of a hydraulic control system for farm tractors with draft and position control in neutral position;

FIGURE 2 shows a sectional view of the main control valve in lifting position at a larger scale; and FIGURE 3 shows a sectional view of the spool taken along the line 3—3 in FIGURE 2.

As can be seen from FIGURE 1, the form of construction provides for two control systems acting on the same control valve. In case of draft control, the control impulse is received from the upper link 1 that is connected to an intermediate lever 2 and pivoted at 3 on the rear wall 4 of the tractor's gear box. A balancing spring 5 permits a certain deviation of the intermediate lever 2. The transfer of the control impulse to the control valve is effected over a rod 6 that rests against the free end of the intermediate lever 2. A telescopic spring 7 is inserted in the rod 6. The rod 6 is pivoted to a two-armed lever 9 at 8, the lower end 10 of which rests against the end 11 of the main control valve 12 and whose other end is pivotally connected to fulcrum 13. For working depth control the fulcrum 13 is adjustable by hand lever 14. The position of the fulcrum 13 determines the working depth, i.e. the force in the upper link 1, at which the main control valve moves into neutral position and thus keeps the implement at a certain height by means of the power lift.

In case of position control, the control impulse is received from the rockshaft 16. A rod 17 is eccentrically pivoted to the rockshaft 16 at 18. A slotted hole connection 19 is preferably provided for at the rod 17 in order to render position control ineffective when draft control is employed. Furthermore, a telescopic spring 43 is located in the rod 17. The rod 17 is pivoted to a two-armed lever, the lower end 21 of which directly acts onto end 11 of the main control valve 12. The upper fulcrum 57 can be adjusted by the hand lever 22 for pre-selecting the lifting height of the mounted implement.

The hydraulic portion of the system consists of a continuously driven pump 23 with constant delivery that draws in oil from the reservoir 25 through line 24 and delivers same through the line 26 to a pre-actuated valve 27. In a bore 28 of the valve 27 a pre-actuated piston 29 is guided whose front control edge 30 blocks the oil return from line 26 through the annular recess 32 and the line 33 to the reservoir 25 when resting against the taperbore 31. A restrictor 34 is located in the head of piston 29 connecting the spaces in front of and behind piston 29. A weak spring 58 acts on piston 29 in closing direction.

Through a control line 36, the space 35 behind the restrictor 34 is connected with a relief valve 37 that is set to the maximum pressure in the system.

The control line 36 further leads to the main valve spool 12. The main spool is longitudinally slidably received in a bore 38 of the valve housing and is biased against the levers 10 and 21 by a spring 39. It is hydraulically pressure compensated and its control surfaces are in charge of controlling the pilot flow for operating the pre-actuated valve 27 and the oil return from the working cylinder 40 through which the rockshaft 16 for lifting the mounted implement is actuated. The control line 36 opens into the annular recess 41 from where the return of the control flow to the reservoir can be interrupted by the control edge 42 of the valve spool 12.

The pressure line 44 to the working cylinder 40 is connected with the annular recess 45 that is released by the control-grooved control edge 46 in lowering position in order to permit the oil return from the working cylinder 40 through the line 44, the annular recess 45 and the line 47 to the reservoir 25.

If the system is to be set to "lifting" the control spool 12 in FIGURE 1 is moved to the right so far that the control edge 42 shuts off annular recess 41. Through the restrictor 34 the same pressure will build up now in front of and behind the valve piston 29 so that the spring 58 can close the piston valve 29 and the full delivery flow of the pump 23 is conducted through line 26, check valve 48, and pressure line 44 to the working cylinder 40. When the control spool 12 returns to neutral position, according to FIGURE 1, the return from the control line 36 through the annular recess 41 to the reservoir 25 is released again. The space 35 behind the piston 29 becomes pressureless and at a low circulating pressure determined by the tension of spring 58 the delivery flow of the pump 23 displaces the piston 29 so far that the full delivery flow of the pump can return through the annular recess 32 and the line 33 to the oil reservoir.

With position control in particular it may happen that the implement slowly lowers due to leak oil losses. The implement is normally lifted again to the set height by means of a temporary oil delivery. However, it may also happen that the control spool 12 is only moved so far that the control surface 42 just throttles, but not completely blocks the return from the annular recess 41 to the reservoir. In this case, the piston valve 29 would not close completely and a pressure would build up that is just sufficient to keep the implement at the present height, i.e. pressure from the pump 23 would permanently counteract the pressure that corresponds to the load on the lifting device. In order to avoid this, the levers 10 and 21 do not act directly on the main spool 12 but on a piston 49 which slidingly fits in a bore 50 of the main control spool 12. The piston 49 has a transverse bore 51 the diameter of which is slightly larger than the diameter of a pin 52 pervading said bore and fastened in the main control spool 12. Therefore, the piston 49 has a small movability that is limited to both sides. The chamber 53 in front of the piston 49 is permanently connected with the annular recess 41 through a bore 54.

As long as the main control spool is in neutral or lowering position, the annular recess 41 and the chamber 53 are connected with the reservoir and therefore pressureless. In the position shown in FIGURE 1, the left side of bore 51 is rested against pin 52 due to the effect of the return spring 39. However, as soon as the control edge 42 has approached the control edge 55 of the housing so far that a throttling of the pilot flow occurs, a pressure will build up in the control line 36, the annular recess 41, and the chamber 53 that is sufficient to move the control spool 12 against the force of spring 39 to the right until the right side of the bore 51 rests against the pin 52. This slight displacement suffices to insure that the control edge 42 completely crosses the control edge 55 and switches the system to "lifting."

The switch-over is effected as soon as the pressure in chamber 53 that acts upon the front surface of the piston 49 exceeds the force of the spring 39. The pressure is reasonably laid out by the adaptation of piston surface and working pressure in such a way that it is only a fractional part of the maximum working pressure. A throttling position in which the pump permanently counteracts a certain detrimental amount of back-pressure is thus no longer possible when shifting from neutral to lifting.

When the system is set to lifting, its sluggishness is generally so great that the control linkage does not move the control spool 12 into neutral position until the throttling position has been crossed. The control edge 42 then is at such a great distance from the control edge 55 that the pressure in the annular recess subsides and the spring 39 can again move the spool 12 to the left so far that the pin 52 abuts against the left side of the bore 51. The flow cross-section between the control edges 42 and 55 is still further enlarged by this.

When the system operates with high working pressures or very small deliveries, it may happen that the movements of spool 12 are so slow that it remains in a throttling position when shifting from lifting into neutral position. In order to safely avoid these critical cases, too, the device is designed according to the invention in such a way that when shifting from lifting to neutral the pressure in the chamber 53 subsides before the control edge 42 crosses the control edge 55.

In addition, the spool 12 has radial bores 59 that are connected with the outer surface of the spool 12. The spool 12 may be designed as a triangular spool (FIGURE 3) and the bores 59 located in such a way that their lateral limitation 61 is flush with the control edge 42. The length of the piston 49 is chosen in such a way that its front edge 60 crosses and closes the bores 59 in neutral position (FIGURE 1) but releases them in lifting position of the spool when the pin 52 abuts against the right side of the bore 51 (FIGURE 2) so that the chamber 53 is then connected with the bores 59. It is further of importance for the function that the bore 54 is designed as a throttle bore. Its cross-section is dimensioned in such a way that even at full working pressure only part of the control flow can pass through the bore 54.

As regards function reference is made to FIGURE 2. When setting the system to lifting the pin 52 is brought into abutment against the right side of the bore 51 as the spool is moved to the right by the pressure in the chamber 53. The control edge 42 thus crosses the control edge 55 so far that the radial bores 59, too, are closed by the control edge 55. At the same time, however, the connection between the bores 59 and the chamber 53 is released by the control edge 60 of the piston 49. The elements are now in the position according to FIGURE 2.

When, during the shifting action from lifting to neutral, the control spool is slowly moved to the left, the control edge 55 will first release the bores 59 and the oil in the chamber 53 can flow off to the reesrvoir over the cross-section of the radial bores 59 that is constantly enlarged as the spool moves on. Since owing to the layout of the cross-section of the bore 54 only part of the control flow can pass through said bore from the line 36 the system continues lifting. Only when the open cross-section of the bores 59 has come so large that the pressure in the chamber 53, acting upon the surface 60 of the piston 49, is smaller than the force of the spring 39, will the latter displace the spool 12 as against the piston 49 so that the pin 52 abuts against the left side of the bore 51. At the same time, the control edge 42 releases the control edge 55 so that the annular recess 41 is relieved. Thereby also the chamber 53 is relieved through bore 54 and the annular recess 41. The control edge 60 of the piston 49 shuts off the bores 59 from the chamber 53. The elements are now back in the position according to FIGURE 1 and the system is set to neutral.

According to the invention the control spool is prevented from developing a throttling position in which no pressure oil is directed to the hydraulic cylinder 40. As soon as a throttling position is about to develop between the control edges 42 and 55 when shifting from neutral to lifting or vice versa, the spool 12 is displaced, due to the build-up and drop-off of pressure in the chamber 53.

Only one embodiment of the invention is described. Variations are intended to form part of this invention insofar as they fall within the framework of the claims.

We claim:

1. In a hydraulic control system, a valve housing defining an axial valve bore, spaced fluid inlet an outlet means communicating with said valve bore, said fluid inlet and outlet means adapted to communicate respectively with sources of relatively high and low fluid pressure, a valve spool axially slidable in said valve bore between a first position establishing fluid communication between said inlet and outlet means and a second position blocking said fluid communication, said valve spool defining an axial chamber and first and second transverse bores communicating said chamber with said valve bore, said first transverse bore being relatively large and said second transverse bore being relatively small, said valve spool and valve bore being so formed that when said valve spool is in its first position said first and second transverse bores communicate said chamber with said outlet and inlet means respectively and when in its second position said first transverse bore is blocked from communicating said chamber with said outlet means and said second transverse bore communicates said chamber with said inlet means, piston means axially slidable in said chamber relative to said valve spool, means operatively associated with said valve spool and said piston means for limiting relative sliding of said piston means between a first location establishing fluid communication between said transverse bores through said chamber and a second location blocking fluid communication between said chamber and said first transverse bore, and means associated with said piston means for sliding same to its second location when said valve spool is in its first position, said valve spool and said piston means being so formed that when said piston means is in its second location said valve spool is slidable toward its second position under the influence of fluid pressure in said chamber.

2. The invention according to claim 1, said limiting means including a pin in said valve spool and extending through a slot in said piston means larger than the diameter of said pin.

3. The invention according to claim 1, further including means biasing said valve spool toward its first position, said biasing means having a predetermined biasing force less than the force for fluid pressure in said chamber tending to slide said valve spool toward its second position when said piston means is in its second location.

References Cited by the Examiner
UNITED STATES PATENTS

| | | | |
|---|---|---|---|
| 2,379,181 | 6/45 | Pontius et al. | 251—38 XR |
| 2,651,915 | 9/53 | Chattler | 137—596.13 XR |
| 2,815,921 | 12/57 | Bigelow | 251—38 |
| 2,964,908 | 12/60 | Pomper et al. | 91—446 XR |
| 3,060,967 | 10/62 | Hancock | 137—596.13 XR |
| 3,088,283 | 5/63 | Furia et al. | 91—457 XR |

M. CARY NELSON, *Primary Examiner.*

MARTIN P. SCHWADRON, *Examiner.*